United States Patent
West (10) Patent No.: US 8,719,266 B2
(45) Date of Patent: *May 6, 2014

(54) DATA PERTURBATION OF NON-UNIQUE VALUES

(71) Applicant: Information Resources, Inc., Chicago, IL (US)

(72) Inventor: John Randall West, Sunnyvale, CA (US)

(73) Assignee: Information Resources, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,216

(22) Filed: Jul. 22, 2013

(65) Prior Publication Data

US 2014/0032269 A1  Jan. 30, 2014

Related U.S. Application Data

(63) Continuation of application No. 12/020,740, filed on Jan. 28, 2008, now Pat. No. 8,504,598.

(60) Provisional application No. 60/886,798, filed on Jan. 26, 2007.

(51) Int. Cl.
*G06F 17/30* (2006.01)

(52) U.S. Cl.
USPC ............................ 707/736; 707/607; 707/954

(58) Field of Classification Search
USPC .................. 707/607, 954, 601; 715/739, 810
See application file for complete search history.

(56) References Cited

U.S. PATENT DOCUMENTS

| | | | |
|---|---|---|---|
| 3,660,605 A | 5/1972 | Rees | |
| 4,047,157 A | 9/1977 | Jenkins | |
| 4,884,264 A | 11/1989 | Servel et al. | |
| 4,908,761 A | 3/1990 | Tai | |
| 5,041,972 A | 8/1991 | Frost | |
| 5,446,878 A | 8/1995 | Royal | |
| 5,548,749 A | 8/1996 | Kroenke et al. | |
| 5,596,331 A | 1/1997 | Bonaffini et al. | |
| 5,675,662 A | 10/1997 | Deaton et al. | |
| 5,726,914 A | 3/1998 | Janovski et al. | |
| 5,737,494 A | 4/1998 | Guinta et al. | |

(Continued)

FOREIGN PATENT DOCUMENTS

| | | |
|---|---|---|
| WO | WO-01/80137 A2 | 10/2001 |
| WO | WO-03/001428 A2 | 1/2003 |

(Continued)

OTHER PUBLICATIONS

Bronnenberg, B. T. et al., "Unobserved Retailer Behavior in Multimarket Behavior", Joint Spatial Dependence in Market Shares and Promotional Variables, Marketing Science, 20, 3, ABI/INFORM Global Summer 2001, pp. 284-299.

(Continued)

*Primary Examiner* — Jean M Corrielus
(74) *Attorney, Agent, or Firm* — Strategic Patents, P.C.

(57) ABSTRACT

In embodiments of the present invention, improved capabilities are described for perturbing non-unique values may comprise finding the non-unique values in a data table, perturbing the non-unique values to render unique values, and using the non-unique values as an identifier for a data item.

12 Claims, 2 Drawing Sheets

(56) References Cited

U.S. PATENT DOCUMENTS

| | | |
|---|---|---|
| 5,758,257 A | 5/1998 | Herz et al. |
| 5,819,226 A | 10/1998 | Gopinathan et al. |
| 5,832,509 A | 11/1998 | Mortis et al. |
| 5,884,305 A | 3/1999 | Kleinberg et al. |
| 5,912,887 A | 6/1999 | Sehgal |
| 5,915,036 A | 6/1999 | Grunkin et al. |
| 5,966,695 A | 10/1999 | Melchione et al. |
| 5,974,396 A | 10/1999 | Anderson et al. |
| 5,978,788 A | 11/1999 | Castelli et al. |
| 6,073,112 A | 6/2000 | Geerlings |
| 6,098,033 A | 8/2000 | Richardson et al. |
| 6,163,774 A | 12/2000 | Lore et al. |
| 6,233,573 B1 | 5/2001 | Bair et al. |
| 6,282,544 B1 | 8/2001 | Tse et al. |
| 6,401,070 B1 | 6/2002 | McManus et al. |
| 6,523,025 B1 | 2/2003 | Hashimoto et al. |
| 6,556,974 B1 | 4/2003 | D'alessandro |
| 6,636,862 B2 | 10/2003 | Lundahl et al. |
| 6,642,946 B1 | 11/2003 | Janes et al. |
| 6,662,192 B1 | 12/2003 | Rebane |
| 6,708,156 B1 | 3/2004 | Gonten |
| 6,920,461 B2 | 7/2005 | Hejlsberg et al. |
| 6,928,434 B1 | 8/2005 | Choi et al. |
| 6,965,886 B2 | 11/2005 | Govrin et al. |
| 7,010,523 B2 | 3/2006 | Greenfield et al. |
| 7,027,843 B2 | 4/2006 | Cromer |
| 7,043,492 B1 | 5/2006 | Neal et al. |
| 7,107,254 B1 | 9/2006 | Dumais et al. |
| 7,133,865 B1 | 11/2006 | Pedersen et al. |
| 7,177,855 B2 | 2/2007 | Witkowski et al. |
| 7,191,183 B1 | 3/2007 | Goldstein |
| 7,239,989 B2 | 7/2007 | Kothuri |
| 7,269,517 B2 | 9/2007 | Bondarenko |
| 7,333,982 B2 | 2/2008 | Bakalash et al. |
| 7,360,697 B1 | 4/2008 | Sarkar et al. |
| 7,376,573 B1 | 5/2008 | Costonis et al. |
| 7,430,532 B2 | 9/2008 | Wizon et al. |
| 7,469,246 B1 | 12/2008 | Lamping |
| 7,490,052 B2 | 2/2009 | Kilger et al. |
| 7,493,308 B1 | 2/2009 | Bair et al. |
| 7,499,908 B2 | 3/2009 | Elnaffar et al. |
| 7,523,047 B1 | 4/2009 | Neal et al. |
| 7,577,579 B2 | 8/2009 | Watarai et al. |
| 7,606,699 B2 | 10/2009 | Sundararajan et al. |
| 7,672,877 B1 | 3/2010 | Acton et al. |
| 7,747,617 B1 | 6/2010 | Bair et al. |
| 7,800,613 B2 | 9/2010 | Hanrahan et al. |
| 7,870,031 B2 | 1/2011 | Bolivar |
| 7,870,039 B1 | 1/2011 | Dom et al. |
| 7,873,529 B2 | 1/2011 | Kruger et al. |
| 7,949,639 B2 | 5/2011 | Hunt et al. |
| 8,041,741 B1 | 10/2011 | Bair et al. |
| 8,160,984 B2 | 4/2012 | Hunt et al. |
| 2001/0034679 A1 | 10/2001 | Wrigley |
| 2001/0044758 A1 | 11/2001 | Talib et al. |
| 2002/0004390 A1 | 1/2002 | Cutaia et al. |
| 2002/0067593 A1 | 6/2002 | Milan |
| 2002/0078018 A1 | 6/2002 | Tse et al. |
| 2002/0078039 A1 | 6/2002 | Cereghini et al. |
| 2002/0091681 A1 | 7/2002 | Cras et al. |
| 2002/0099597 A1 | 7/2002 | Gamage et al. |
| 2002/0099598 A1 | 7/2002 | Eicher, Jr. et al. |
| 2002/0099692 A1 | 7/2002 | Shah et al. |
| 2002/0116213 A1 | 8/2002 | Kavounis et al. |
| 2002/0123945 A1 | 9/2002 | Booth et al. |
| 2002/0161520 A1 | 10/2002 | Dutta et al. |
| 2002/0169657 A1 | 11/2002 | Singh et al. |
| 2002/0186818 A1 | 12/2002 | Arnaud et al. |
| 2002/0194145 A1 | 12/2002 | Boucher et al. |
| 2003/0004779 A1 | 1/2003 | Rangaswamy et al. |
| 2003/0018513 A1 | 1/2003 | Hoffman et al. |
| 2003/0028417 A1 | 2/2003 | Fox |
| 2003/0028424 A1 | 2/2003 | Kampff et al. |
| 2003/0036270 A1 | 2/2003 | Yu et al. |
| 2003/0046120 A1 | 3/2003 | Hoffman et al. |
| 2003/0046121 A1 | 3/2003 | Menninger et al. |
| 2003/0065555 A1 | 4/2003 | von Gonten et al. |
| 2003/0083925 A1 | 5/2003 | Weaver et al. |
| 2003/0083947 A1 | 5/2003 | Hoffman et al. |
| 2003/0088474 A1 | 5/2003 | Hoffman et al. |
| 2003/0088565 A1 | 5/2003 | Walter et al. |
| 2003/0093340 A1 | 5/2003 | Krystek et al. |
| 2003/0126143 A1 | 7/2003 | Roussopoulos et al. |
| 2003/0149586 A1 | 8/2003 | Chen et al. |
| 2003/0158703 A1 | 8/2003 | Lumme et al. |
| 2003/0158749 A1 | 8/2003 | Olchanski et al. |
| 2003/0171978 A1 | 9/2003 | Jenkins et al. |
| 2003/0177055 A1 | 9/2003 | Zimmerman, Jr. et al. |
| 2003/0200129 A1 | 10/2003 | Klaubauf et al. |
| 2003/0210278 A1 | 11/2003 | Kyoya et al. |
| 2003/0228541 A1 | 12/2003 | Hsu et al. |
| 2003/0233297 A1 | 12/2003 | Campbell |
| 2004/0030593 A1 | 2/2004 | Webster et al. |
| 2004/0107205 A1 | 6/2004 | Burdick et al. |
| 2004/0193683 A1 | 9/2004 | Blumofe |
| 2004/0210562 A1 | 10/2004 | Lee et al. |
| 2004/0220937 A1 | 11/2004 | Bickford et al. |
| 2004/0225670 A1 | 11/2004 | Cameron et al. |
| 2005/0039033 A1 | 2/2005 | Meyers et al. |
| 2005/0043097 A1 | 2/2005 | March et al. |
| 2005/0060300 A1 | 3/2005 | Stolte et al. |
| 2005/0065771 A1 | 3/2005 | Chen et al. |
| 2005/0149537 A1 | 7/2005 | Balin et al. |
| 2005/0187977 A1 | 8/2005 | Frost |
| 2005/0197883 A1 | 9/2005 | Kettner et al. |
| 2005/0197926 A1 | 9/2005 | Chinnappan et al. |
| 2005/0216512 A1 | 9/2005 | Dor |
| 2005/0237320 A1 | 10/2005 | Itoh et al. |
| 2005/0240085 A1 | 10/2005 | Knoell et al. |
| 2005/0240577 A1 | 10/2005 | Larson et al. |
| 2005/0246307 A1 | 11/2005 | Bala |
| 2005/0267889 A1 | 12/2005 | Snyder et al. |
| 2006/0009935 A1 | 1/2006 | Uzarski et al. |
| 2006/0028643 A1 | 2/2006 | Gottlieb et al. |
| 2006/0080141 A1 | 4/2006 | Fusari et al. |
| 2006/0080294 A1 | 4/2006 | Orumchian et al. |
| 2006/0164257 A1 | 7/2006 | Giubbini |
| 2006/0206485 A1 | 9/2006 | Rubin et al. |
| 2006/0212413 A1 | 9/2006 | Rujan et al. |
| 2006/0218157 A1 | 9/2006 | Sourov et al. |
| 2006/0259358 A1 | 11/2006 | Robinson et al. |
| 2006/0282339 A1 | 12/2006 | Musgrove et al. |
| 2007/0028111 A1 | 2/2007 | Covely |
| 2007/0061185 A1 | 3/2007 | Peters et al. |
| 2007/0118541 A1 | 5/2007 | Nathoo |
| 2007/0160320 A1 | 7/2007 | McGuire et al. |
| 2007/0174290 A1 | 7/2007 | Narang et al. |
| 2007/0203919 A1 | 8/2007 | Sullivan et al. |
| 2007/0276676 A1 | 11/2007 | Hoenig et al. |
| 2008/0033914 A1 | 2/2008 | Cherniack et al. |
| 2008/0059489 A1 | 3/2008 | Han et al. |
| 2008/0077469 A1 | 3/2008 | Philport et al. |
| 2008/0147699 A1 | 6/2008 | Kruger et al. |
| 2008/0162302 A1 | 7/2008 | Sundaresan et al. |
| 2008/0168027 A1 | 7/2008 | Kruger et al. |
| 2008/0168028 A1 | 7/2008 | Kruger et al. |
| 2008/0168104 A1 | 7/2008 | Kruger et al. |
| 2008/0228797 A1 | 9/2008 | Kenedy et al. |
| 2008/0256028 A1 | 10/2008 | Kruger et al. |
| 2008/0256275 A1 | 10/2008 | Hofstee et al. |
| 2008/0263000 A1 | 10/2008 | West et al. |
| 2008/0263065 A1 | 10/2008 | West |
| 2008/0270363 A1* | 10/2008 | Hunt et al. ............ 707/3 |
| 2008/0276232 A1 | 11/2008 | Aguilar et al. |
| 2008/0288209 A1 | 11/2008 | Hunt et al. |
| 2008/0288522 A1 | 11/2008 | Hunt et al. |
| 2008/0288538 A1 | 11/2008 | Hunt et al. |
| 2008/0288889 A1* | 11/2008 | Hunt et al. ............ 715/810 |
| 2008/0294372 A1 | 11/2008 | Hunt et al. |
| 2008/0294583 A1 | 11/2008 | Hunt et al. |
| 2008/0294996 A1* | 11/2008 | Hunt et al. ............ 715/739 |
| 2008/0319829 A1* | 12/2008 | Hunt et al. ............ 705/10 |
| 2009/0006156 A1* | 1/2009 | Hunt et al. ............ 705/7 |
| 2009/0006309 A1 | 1/2009 | Hunt et al. |

(56) References Cited

U.S. PATENT DOCUMENTS

| | | | |
|---|---|---|---|
| 2009/0006490 | A1 | 1/2009 | Hunt et al. |
| 2009/0006788 | A1 | 1/2009 | Hunt et al. |
| 2009/0012971 | A1 | 1/2009 | Hunt et al. |
| 2009/0018891 | A1 | 1/2009 | Eder |
| 2009/0018996 | A1* | 1/2009 | Hunt et al. ................ 707/2 |
| 2009/0055445 | A1 | 2/2009 | Liu et al. |
| 2009/0070131 | A1 | 3/2009 | Chen |
| 2009/0083306 | A1 | 3/2009 | Sichi et al. |
| 2009/0132541 | A1 | 5/2009 | Barsness et al. |
| 2009/0132609 | A1 | 5/2009 | Barsness et al. |
| 2009/0150248 | A1 | 6/2009 | Anttila et al. |
| 2010/0070333 | A1 | 3/2010 | Musa |
| 2010/0094882 | A1 | 4/2010 | Lee |
| 2012/0173472 | A1 | 7/2012 | Hunt et al. |

FOREIGN PATENT DOCUMENTS

| | | | |
|---|---|---|---|
| WO | WO-2008/092147 | A2 | 7/2008 |
| WO | WO-2008/092147 | A9 | 7/2008 |
| WO | WO-2008092147 | A2 | 7/2008 |
| WO | WO-2008092149 | A2 | 7/2008 |

OTHER PUBLICATIONS

Guadagni, P. M. et al., "A logit model of brand choice calibrated on scanner data", Marketing Science, vol. 2, No. 3 Summer 1983, 203-238 pgs.

Colliat, George, "OLAP, relational, and multidimensional database systems", George Colliat, OLAP, relational, and multidimensional database systems, ACM SIGMOD Record, v.25 n.3, p. 64-69, Sep. 1996, 64-69.

Kimball, Ralph et al., "Why decision support fails and how to fix it", Ralph Kimball, Kevin Strehlp, Why decision support fails and how to fix it, ACM Record, v.24 n.3, p. 92-97, Sep. 1995, 92-97.

"Do household scanner data provide representative inferences from brand choices: a comparison with store data", S Gupta. p. Chintagunta. A Kaul, DR Wittink—Journal of Marketing Nov. 1996, pp. 383-398.

Inderpa, S. M. et al., "Maintenance of data cubes and summary tables in a warehouse", Proceedings of the 1997 ACM SIGMOD international conference on Management of data, Tucson, Arizona, United States May 11-15,, p. 100-111.

Swait, J. et al., "Enriching Scannel Panel Models with Choice Experiments", Marketing Science,22(4); ABI/INFORM Global Fall 2003, 442-460 pgs.

"Combining sources of preference data", Hensher, D. et al., Journal of Econometrics 89 (1999) Elsevier 1999, pp. 197-221.

web.archive.org, , "Our Mission", PMGBenchmarking.com Sep. 18, 2000, pp. 1.

Zadrozny, Bianca et al., "Second International Workshop on Utility-Based Data Mining", Workshop Chairs Bianca Zadrozny, Gary Weiss, Maytal Saar-Tsechansky. Held in conjuctionwith the KDD conference, Aug. 20, 2006, Copyright 2006 by the Association for Computing Machinery, Inc (AMC) Aug. 20, 2006, 81 pages.

"Webcasts", Web.archive.org, PMGBenchmarking.com Jun. 8, 2002, pp. 1-2.

web.archive.org, , "Measure Your Performance", PMGBenchmarking.com Jun. 7, 2002, pp. 1-3.

Intl Searching Authority, , "International Search Report", for US Patent Application No. PCT/US2008/052195, mailed on Jun. 25, 2008, 8 pages.

"Signals of Performance", Web.archive.org, PMGBenchmarking.com Jun. 2, 2002, pp. 1-2.

"The Performance Measurement Group Rolls out Product Development Benchmarking Series Online", PRTM Press release Jun. 11, 1999, 1-2.

PRTM Press Release, "New Survey Addresses Product and Marketing Management", May 21, 1999, 1 of 1.

Greenberg, Ken et al., "Using Panels to Understand the Consumer", Ken Greenberg, Vice President, Marketing, ACNielsen Homescan, US, Published May 2006. pp. 1-3.

Chaudhuri, Surajit et al., "An overview of data warehousing and OLAP technology", Surajit Chaudhuri, Umeshwar Dayal, An overview of data warehousing and OLAP technology, ACM SIGMOD Record, v.26 n. 1, p. 65-74, Mar. 1997, 65-74.

PRTM Press Release, "Fujitsu and PRTM/PMG Announce Supply-Chain Benchmarking and Consulting Collaboration in Japan", Mar. 1, 1999, 1 of 1.

PRTM Press Release, "High Tech Management Consultants PRTM Launch Online Benchmarking Company", Mar. 1, 1999, pp. 1-2.

Dan, Briody, "Matching Customer Buying Patterns online and offline poses challenges for Retailers", May 29, 2000, p. 36.

Acxiom Bureau Services Brochure 2009, pp. 1-9.

Abilitec Product Brochure pp. 108 2008, pp. 1-8.

Fangyan, R et al., "Spatial Hierarchy and OLAP-Favored Search in Spatial Data Warehouse", Proceedings of the 6th ACM International Workshop on Data Warehousing and OLAP 2003, pp. 48-55.

Malhotra, N et al., "Marketing research in the new millennium: Emerging issues and trends", Marketing Intelligence and Planning vol. 19, No. 4. 2001, 216-235 Pgs.

"Parameter bias from unobserved effects in the multinomiallogit model of consumer choice", Abramson, C. et al.,—Journal of Marketing Research vol. XXXVII, Nov. 2000, pp. 410-426 2000, pp. 410-426.

web.archive.org, "Supply-Chain Management Benchmarking Series—Tips & Slips", vol. 4: Subscriber Site Navigation, PMGBenchmarking.com, vol. 4: Subscriber Site Navigation Feb. 8, 2011, pp. 1-11.

"SAP Partnership—Product Offerings and Credentials", Web.archive.org, PMGBenchmarking.com Feb. 8, 2001, 1.

"Supply-Chain Management Benchmarking Series—Tips & Slips, vol. 3: Plan Survey FAQ's", Web.archive.org, PMGBenchmarking.com Feb. 8, 2001, 1-6.

web.archive.org, "Supply-Chain Management Benchmarking Series vol. 2", PMGBenchmarking.com Feb. 8, 2001, pp. 1-3.

"SAP Partnership—a research note published by AMR on the PMG/SAP Alliance", Web.archive.org, PMGBenchmarking.com Feb. 10, 2001, p. 1 of 1.

web.archive.org, "SAP Partnership—Continuous Performance Assessments", PMGBenchmarking.com, Continuous Performance Assessments Feb. 10, 2001, pp. 1.

"SAP Partnership—Peformance Snapshots", Web.archive.org, PMGBenchmarking.com Feb. 10, 2001, pp. 1-2.

"Missing price and coupon availability data in scanner panels: Correcting for the self selection bias in choice model parameters", Erdem, T. et al., Journal of Econometrics 89 (1999) 1999—Elsevier, pp. 177-196.

"Commercial use of UPC scanner data", Industry and academic perspectives, Bucklin, et al. Marketing Science, 1999. vol. 18, No. 3, 1999, pp. 247-273 1999, pp. 247-273.

Kim, Byung-Do et al., "Purchase frequency, sample selection, and price sensitivity: The heavy-user bias", Marketing Letters 5:1 (1994). 1994 Kluwer Academic Publishers, pp. 57-67.

Qian, J et al., ""Optimally Weighted Means in Stratified Sampling"", amstat.org 1994, pp. 863-866.

Mccullock, R. et al., "An Exact Likelihood Analysis of the Multinomial Probit Model", Journal of Econometrics,vol. 64 1994, pp. 207-240.

Baron, S. et al., "The Challenges of Scanner Data", The Journal of the Operational Research Society, vol. 46, No. 1 1994, 50-61 pgs.

Bucklin, Randolph E. et al., "Brand choice, purchase incidence, and segmentation: An integrated modeling", Journal of Marketing Research 1992—jstor.org, 16 pages.

Shilakes, Christopher C. et al., Enterprise Information Portals, Merrill Lynch, Enterprise Software Team Nov. 16, 1998, 64 pages.

"Product Development Benchmarking Series", Web.archive.org, PMGBenchmarking.com Dec. 6, 2000, 1-2.

web.archive.org, "SAP Partnership", PMGBenchmarking.com Dec. 6, 2000, p. 1 of 1.

"Supply-Chain Management Benchmarking Series", Web.archive.org, PMGBenchmarking.com Dec. 6, 2000, pp. 1-2.

"Supply-Chain Management and Product Development Benchmarking Series", Web.archive.org, PMGBenchmarking.com Dec. 5, 2000, pp. 1-2.

(56) References Cited

OTHER PUBLICATIONS

"Supply Chain Letter", Web.archive.org, supply-chain.org Dec. 5, 1998, pp. 1-12.

"U.S. Appl. No. 12/023,305, Notice of Allowance mailed Dec. 13, 2011", Dec. 13, 2011, 11 Pgs.

Kamakura, Wagner A. et al., "Statistical Data Fusion for Cross-Tabulation", University of Pittsburgh, University of Groningen, SOM theme B: Marketing and Networks Mar. 12, 1996, 34 pages.

"U.S. Appl. No. 12/020,740, Non-Final Office Action mailed Nov. 26, 2012", Nov. 26, 2012, 11 pgs.

"U.S. Appl. No. 12/020,740 Non Final Office Action mailed Nov. 10, 2011", Nov. 10, 2011, 14 Pgs.

Renard, Y , "Singular perturbation approach to an elastic dry friction problem with non monotone coefficient", Quarterly of Applied Mathematics, LVIII, No. 2:303-324, 2000 Apr. 11, 1997, 27 pages.

web.archive.org, "Questions frequently asked by development professionals considering a subscriptions to the Product Development Benchmarking Series", PMGBenchmarking.com Oct. 6, 2000, pp. 1-4.

Intl Searching Authority, , "International Search Report", for US Patent Application No. PCT/US2008/052187, mailed on Oct. 30, 2008, 8 pages.

"U.S. Appl. No. 12/020,786, Final Office Action mailed Oct. 29, 2012", Oct. 29, 2012, 14 pgs.

"U.S. Appl. No. 13/418,518, Non-Final Office Action mailed Oct. 25, 2012", 37 pages.

"U.S. Appl. No. 12/020,786, Non-Final Office Action mailed Oct. 20, 2011", 15 pages.

"SAP and PMG Introduce Industry-specific Key Performance Indicators for Supply-Chain Operations", PRTM Press Release Jan. 31, 2000, pp. 1-2.

PRTM Press Release,, "University of Michigan/OSAT and the Performance Measurment Group Launch a new Benchmarking Initiative for the Automotive Industry", Jan. 21, 2000 , pp. 1-2.

"Improving performance and cutting costs", Strategic Direction, v16n1 Jan. 2000, pp. 1-4.

"Industry standard benchmarking program", SAP Press release Jan. 20, 2000, 1 of 1.

"Benchmarking Studies by PRTM", Web.archive.org, prtm.com Jan. 17, 1998, pp. 1-4.

Dimensions: Executive Summary, "The Performance Measurement Group", Jul. 2000, pp. 1-4.

"Supply-Chain Management Benchmarking Series vol. 1", Web. archive.org, PMGBenchmarking.com Feb. 8, 2001, pp. 1-5.

"A framework for evaluating privacy preserving data mining algorithms", [PDF] from aau.dk,E Bertino, IN Fovino . . .—Data Mining and Knowledge . . . ,2005—Springer, pp. 121-154.

"Access control: Policies, models, and mechanisms", P. Samarati, SC de Vimercati—. . . of Security Analysis and Design, 2001—Springer, 405 pages.

"Achieving privacy preservation when sharing data for clustering[PDF] from pp.ua S Oliveira", Secure Data Management, 2004, Springer, pp. 67-82.

"U.S. Appl. No. 10/783,323, Notice of Allowance mailed Oct. 6, 2010", 15 pages.

"U.S. Appl. No. 10/783,323, Non-Final Office Action mailed Jan. 28, 2010", 155 pages, 2 attachments.

"U.S. Appl. No. 11/927,502, Non-Final Office Action mailed Jan. 8, 2009", 12 pgs.

"U.S. Appl. No. 11/927,528 , Non-Final Office Action mailed Nov. 30, 2009", 11 pgs.

"U.S. Appl. No. 11/927,550, Non-Final Office Action mailed Jan. 8, 2009", 12 pgs.

"U.S. Appl. No. 11/927,565, Non-Final Office Action mailed Jan. 9, 2009", 12 pgs.

"U.S. Appl. No. 12/020,740, Final Office Action mailed Oct. 27, 2010", 12 pgs.

"U.S. Appl. No. 12/020,740 Notice of Allowance mailed Jun. 7, 2013", 11 pages.

"U.S. Appl. No. 12/020,740, Non-Final Office Action mailed Mar. 30, 2011", 8 pages.

"U.S. Appl. No. 12/020,740, Non-Final Office Action mailed Mar. 30, 2011", 18 pages.

"U.S. Appl. No. 12/020,786, Non-Final Office Action mailed May 11, 2010", 15 Pages.

"U.S. Appl. No. 12/021,227, Non-Final Office Action mailed Apr. 4, 2011", 26 pages.

"U.S. Appl. No. 12/021,263, Non Final Office Action mailed Jul. 22, 2009", 27 pages.

"U.S. Appl. No. 12/021,268, Non-Final Office Action mailed Mar. 26, 2010", 12 pages.

"U.S. Appl. No. 12/021,495, Notice of Allowance mailed Mar. 24, 2011", 9 pgs.

"U.S. Appl. No. 12/021,495, Non-Final Office Action mailed May 26, 2010", 15 pages.

"U.S. Appl. No. 12/021,916, Final Office Action mailed Aug. 1, 2013", 20 pages.

"U.S. Appl. No. 12/021,916, Non-Final Office Action mailed Jul. 25, 2011", 40 pages.

"U.S. Appl. No. 12/022,667 Final Office Action mailed Dec. 19, 2011", 14 pages.

"U.S. Appl. No. 12/022,667 Non-Final Office Action mailed Mar. 14, 2013", 15 pages.

"U.S. Appl. No. 12/022,667, Non-Final Office Action mailed Apr. 8, 2011", 17 pages.

"U.S. Appl. No. 12/023,200, Non-Final Office Action mailed Jul. 24, 2009", 32 Pgs.

"U.S. Appl. No. 12/023,284, Non-Final Office Action mailed Jun. 24, 2009", 17 pgs.

"U.S. Appl. No. 12/023,294, Non-Final Office Action mailed Jun. 25, 2009", 13 pgs.

"U.S. Appl. No. 12/023,305, Non-Final Office Action mailed Aug. 18, 2010", 16 pgs.

"U.S. Appl. No. 12/023,310, Non-Final Office Action mailed Sep. 22, 2010", 19 pages.

"U.S. Appl. No. 12/023,400, Non-Final Office Action mailed Aug. 11, 2010", 8 pgs.

"U.S. Appl. No. 13/418,518 Notice of Allowance mailed Mar. 19, 2013", 13 pages.

"U.S. Appl. No. 10/783,323, Final Office Action mailed May 8, 2009", 22 pages.

"U.S. Appl. No. 11/927,515, Non-Final Office Action mailed Feb. 17, 2010", 10 Pgs.

"U.S. Appl. No. 12/020,786, Final Office Action mailed Jan. 1, 2011", 10 Pages.

"U.S. Appl. No. 12/021,227, Final Office Action mailed Dec. 2, 2011", 18 pages.

"U.S. Appl. No. 12/021,227, Non-Final Office Action mailed Sep. 26, 2013", 26 pages.

"U.S. Appl. No. 12/021,495, Final Office Action mailed Feb. 16, 2011", 14 pages.

"U.S. Appl. No. 12/021,916, Final Office Action mailed Mar. 13, 2012", 15 pages.

"U.S. Appl. No. 12/021,916, Non-Final Office Action mailed Apr. 12, 2013", 22 pages.

"U.S. Appl. No. 12/023,294, Final Office Action mailed Mar. 10, 2010", 14 pages.

"U.S. Appl. No. 12/023,305, Final Office Action mailed Apr. 27, 2011", 14 pages.

"U.S. Appl. No. 12/023,310, Final Office Action mailed Apr. 26, 2011", 16 pages.

"U.S. Appl. No. 12/023,400 , Final Office Action mailed Apr. 6, 2011", 10 pages.

Lohse, G L. et al., "Consumer buying behavior on the Internet: Findings from panel data.", http://knowledge.wharton.upenn,edu/pdfs/793.pdf, 32 pages.

Chaudhuri, S. et al., "Database technology for decision support systems", Chaudhuri, S.; Dayal, U.; ganti, V.; , "Database technology for decision support systems," Computer, vol. 34, No. 12, pp. 48-55, Dec. 2001, pp. 48-55.

(56) References Cited

OTHER PUBLICATIONS

Kong, E B. et al., "Error-Correcting Output Coding Corrects Bias and Variance", http:/citeseer.nj.nec.com/kong95errorcorrecting.html, 9 pages.

"On the design and quantification of privacy preserving data mining algorithms[PDF] from utdallas.", edu D Agrawal . . . —Proceedings of the twentieth ACM SIGMOND—. . . ,2001—dl.acm.org, pp. 247-255.

"Personalized privacy preservation[PDF] from sabanciuniv.edu X", Xiao . . . —Proceedings of the 2006 ACM SIGMOD international . . . ,2006—dl.acm.org, pp. 229-240.

"Protecting Consumer Data in Composite Web Services[Pdf] from rmit.edu.au", C Pearce, P Bertok . . . —Security and Privacy in the Age of . . . , 2005—Springer, pp. 1-16.

"Secure computer system: Unified exposition and multics interpretation", DE Bell, LJ La Padula—1976 DTIC Document, 133 pages.

"State-of-the-art in privacy preserving data mining", [PDF] from sigmod.org Vs Verykios, E Bertino, in Fovino . . . —ACM Sigmod . . . ,2004—dl.acm.org, pp. 50-57.

"The applicability of the perturbation based privacy preserving data mining for real-world data[PDF] from utdallas.edu L Liu, M", Kantarcioglu . . . —Data & Knowledge Engineering, 2008—Elsevier, pp. 5-21.

\* cited by examiner

DATA PERTURBATION OF NON-UNIQUE VALUES

CROSS-REFERENCE TO RELATED APPLICATIONS

This application is a continuation of U.S. patent application Ser. No. 12/020,740 filed Jan. 28, 2008, which claims the benefit of U.S. Pat. App. No. 60/886,798 filed on Jan. 26, 2007. The entire content of each of these applications is hereby incorporated by reference.

BACKGROUND

1. Field

This invention relates to methods and systems for aggregating data, and more specifically, to perturbing data, such as values in a table, so as to decrease the time it takes to aggregate data.

2. Description of Related Art

OLAP applications provide an analysis of data from a data warehouse. One step in providing this analysis may involve aggregating the data, such as into data cubes or data hypercubes. Unfortunately, the process of aggregating data can be relatively slow, and users may be kept waiting while an aggregation is being produced. There is, therefore, a need for a method that accelerating the process of aggregating data from a data warehouse or datamart.

SUMMARY

The methods disclosed herein include methods for perturbing non-unique values. A method for perturbing the non-unique values may comprise finding the non-unique values in a data table. The method may further comprise perturbing the non-unique values to render unique values and using the non-unique values as an identifier for a data item.

A method for perturbing the non-unique values may comprise finding the non-unique values in a fact data table. In the method, the fact data table may be a retail sales dataset, a syndicated sales dataset, point-of-sales dataset, a syndicated causal dataset, an internal shipment dataset, and an internal financial dataset. In embodiments, the syndicated sales dataset may be a scanner dataset, an audit dataset, and a combined scanner-audit dataset. The method may further comprise perturbing the non-unique values to render unique values and using the non-unique values as an identifier for a data item.

A method for perturbing the non-unique values may comprise finding the non-unique values in a dimension data table. In the method, the dimension may be a hierarchy, a category, a data segment, a time, a venue, geography, demography, a behavior, a life stage, and a consumer segment. The method may further comprise perturbing the non-unique values to render unique values and using the non-unique values as an identifier for a data item.

A method for perturbing the non-unique values may comprise associating an availability condition with a data perturbation action. The availability condition may be used to assess permission to perform the data perturbation action. In the method and system, the availability condition may be based on a statistical validity, a sample size, permission to release data, qualification of an individual to access the data, the type of data, the permissibility of access to combinations of the data, and a position of the individual within an organization. The method may further comprise permitting the data perturbation action when the data perturbation action is not forbidden by the availability condition. Further, the method may comprise finding the non-unique values in a data table, perturbing the non-unique values to render unique values, and using the non-unique values as an identifier for a data item.

These and other systems, methods, objects, features, and advantages of the present invention will be apparent to those skilled in the art from the following detailed description of the preferred embodiment and the drawings. Capitalized terms used herein (such as relating to titles of data objects, tables, or the like) should be understood to encompass other similar content or features performing similar functions, except where the context specifically limits such terms to the use herein.

BRIEF DESCRIPTION OF THE FIGURES

The invention and the following detailed description of certain embodiments thereof may be understood by reference to the following figures.

DETAILED DESCRIPTION

An aspect of the present invention involves an OLAP application producing an aggregation of data elements from one or more tables, such as fact tables and/or dimension tables, wherein the aggregation includes at least one non-aggregated dimension. Unlike a fixed OLAP cube structure, this non-aggregated dimension may be queried dynamically. The dimension may be associated with hierarchical, categorical information. In embodiments, a fact table may encompass a Cartesian product or cross join of two source tables. Thus, the fact table may be relatively large. In some embodiments, one of the source tables may itself consist of a fact table (e.g., a database table comprising tuples that encode transactions of an enterprise) and the other source table may consist of a projection table (e.g., a database table comprising tuples that encode projections related to the enterprise). In any case, the aggregation may comprise a data cube or data hypercube, which may consist of dimensions drawn from the fact table of which the aggregation is produced, wherein the dimensions of the fact table may be associated with the fact table's columns.

In applications, a user of the OLAP application may engage the application in a data warehouse activity. This activity may comprise processing a query and producing an analysis of data. This data may reside in an aggregation that the OLAP application produces. The size and/or organization of the aggregation may result in a relatively long query processing time, which the user may experience during the data warehouse activity.

An aspect of the present invention may be to reduce the query processing time that the user experiences. One approach to reducing this query processing time may involve a pre-computing step. This step may involve pre-calculating the results of queries to every combination of information category and/or hierarchy of the aggregation. Alternatively or additionally, this step may involve pre-aggregating data so as to avoid the cost of aggregating data at query time. In other words, the OLAP application may utilize computing time and data storage, in advance of the user's data warehouse activity, to reduce the query processing time that the user experiences.

Another approach to reducing the query processing time that the user experiences may involve perturbing values in a fact table so that all values within a particular column of the fact table are unique. Having done this, an aggregating query may be rewritten to use a relatively fast query command. For example, in a SQL environment, with unique values in a particular column of a fact table, a SQL DISTINCT command may be used, instead of a relatively slow SQL CROSS JOIN command, or the like. This rewriting of fact table values may reduce the query processing time that it takes to execute the aggregating query, optionally without the relatively costly step of pre-aggregating data.

An aspect of the present invention may be understood with reference to the following example, which is provided for the purpose of illustration and not limitation. This example deals with queries that provide flexibility with respect to one dimension, but it will be appreciated that the present invention supports flexibility with respect to more than one dimension. Given a sales fact table (sales fact) including venue, item, and time dimensions and a projection fact table (projection) including venue, time, and venue group dimensions, and given that each sales fact in the fact table contains actual sales data and each fact in the projection table contains a projection weight to be applied to actual sales data so as to produce projected sales information, then the following query may produce a projected sales calculation and perform a distribution calculation. (In OLAP, a distribution calculation may happen when two fact tables are used to scope each other and one table has a higher cardinality than the other.):

SELECT
venue_dim_key,
item_dim.attr1_key,
sum (distinct projection.projectedstoresales),
sum (projection.weight*salesfact.sales)
FROM salesfact, projection, item_dim, time_dim
WHERE (
// 13 weeks of data
(time_dim.qtr_key=11248)
// break out the 13 weeks
AND (salesfact.time_dim_key=time_dim.time_dim_key)
// join projection and salesfact on venue_dim_key
AND
   (projection.venue_dim_key=salesfact.venue_dim_key)
// join projection and salesfact on time_dim_key
AND
   (projection.time_dim_key=salesfact.time_dim_key)
// break out a group of venues
AND (projection.venue_group_dim_key=100019999)
// some product categories
AND (item_dim.attr1_key in (9886))
// break out the items in the product categories
AND
   (item_dim.item_dim_key=salesfact.item_dim_key))
GROUP BY venue_dim_key, item_dim.attr1_key This example query adds up projected store sales for the stores that have sold any item in category 9886 during a relevant time period. Assuming that the data in the projection fact table is perturbed so that the values in projection.projectedstoresales are unique, the expression sum (distinct projection.projectedstoresales) is sufficient to calculate the total projected sales for all of the stores that have sold any of those items during the relevant period of time.

As compared with operating on data that is not perturbed (an example of this follows), it will be appreciated that perturbing data in advance of querying the data provides this improved way to scrub out the duplications. This appreciation may be based on the observation that it is likely that multiple salesfact rows will be selected for each store. In tabulating the projected store sales for the stores that have any of the selected items sold during the relevant time period, each store should be counted only once. Hence the combination of first perturbing the data and then using the distinct clause. Moreover, if overlapping venue groups have the same stores, the above query also works. It follows that analogous queries may work with multiple time periods, multiple product attributes, and multiple venue groups. Such queries will be appreciated and are within the scope of the present disclosure.

In contrast if the data is not perturbed and so it is not guaranteed that the values in projection.projectedstoresales are unique, then the following sequence of queries may be required:

First:
CREATE TABLE store_temp AS SELECT
projection.venue_dim_key,
projection.time_dim_key,
item_dim.attr1_key,
min(projectedstoresales)
FROM salesfact, projection, item_dim, time dim
WHERE (
// 13 weeks of data
(time_dim.qtr_key=11248)
// break out the 13 weeks
AND (salesfact.time_dim_key=time dim.time_dim_key)
// join projection and salesfact on venue_dim_key
AND
   (projection.venue_dim_key=salesfact.venue_dim_key)
// join projection and salesfact on time_dim_key
AND
   (projection.time_dim_key=salesfact.time_dim_key)
// break out a group of venues
AND (projection.venue_group_dim_key=100019999)
// some product categories
AND (item_dim.attr1_key in (9886))
// break out the items in the product categories
AND
   (item_dim.item_dim_key=salesfact.item_dim_key))
GROUP BY time_dim_key, venue_dim_key, item_dim.attr1_key Second, apply a measure to calculate the distribution itself:
SELECT sum(projectedstoresales) FROM store temp
   group by venue_dim_key, item_dim.attr1_key
Finally, an additive part of the measure is required:
SELECT sum (projection.weight*salesfact.sales)
FROM salesfact, projection, item_dim, time_dim
WHERE (
// 13 weeks of data
(time_dim.qtr_key=11248)
// break out the 13 weeks
AND (salesfact.time_dim_key=time dim.time_dim_key)
// join projection and salesfact on venue_dim_key
AND
   (projection.venue_dim_key=salesfact.venue_dim_key)
// join projection and salesfact on time_dim_key
AND
   (projection.time_dim_key=salesfact.time_dim_key)
// break out a group of venues
AND (projection.venue_group_dim_key=100019999)
// some product categories
AND (item_dim.attr1_key in (9886))
// break out the items in the product categories
AND
   (item_dim.item_dim_key=salesfact.item_dim_key))
GROUP BY venue_dim_key, item_dim.attr1_key
DROP TEMP TABLE store_temp It will be appreciated that join explosions can result in the temporary table store_temp when a lot of attribute combinations are required for the query. For example, increasing the number of time periods, product attributes, and/or venue groups will multiply the number of records in the temporary table. Conversely, the perturbed data join of the present invention is not affected by this problem since both dimensions can be processed as peers even though the projection table has no key for the item dimension.

Figure 1:
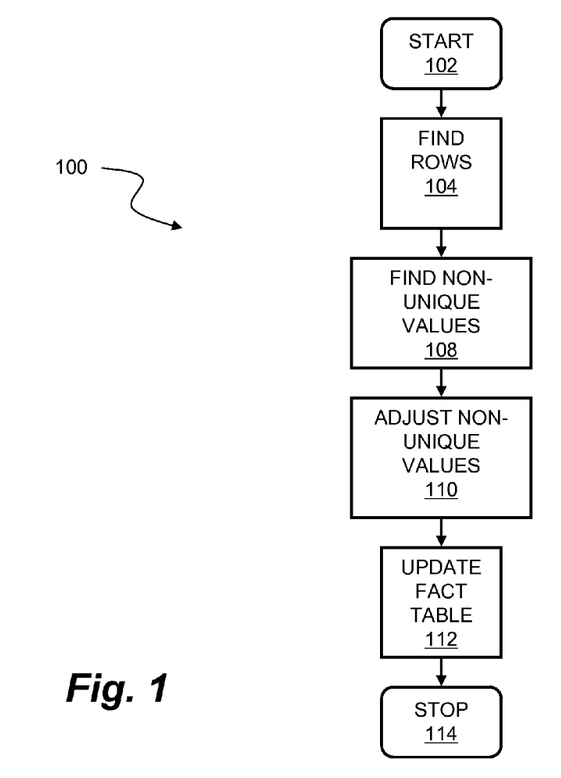
FIG. 1 provides a logical flow diagram for perturbing a fact table.

Referring to FIG. 1, a logical process 100 for perturbing a fact table is shown. The process begins at logical block 102 and may continue to logical block 104, where the process may find all of the rows in a fact table that match a targeted dimension member or value (subject, perhaps, to a filter). The process may continue to logical block 108, where the process may determine non-unique column values within those rows. Then, processing flow may continue to logical block 110 where an epsilon (possibly different if there are matching non-unique values) or other relatively small value may be added or subtracted to each of the non-unique values in such a manner as to render any and all of the column values to be unique. Next, processing flow may continue to logical block 112, where the values that were modified in the previous step are updated in the fact table so that the fact table contains the updated values. Finally, processing flow continues to logical block 114, where the procedure ends.

In an embodiment, this logical process 100 may speed up affected queries by allowing for a SQL DISTINCT clause to be used, instead of an extra join that would otherwise be needed to resolve the identical column values. In an embodiment, this process 100 may make it possible to use leaf-level data for hierarchical aggregation in OLAP applications, rather than using pre-aggregated data in such applications.

Figure 2:
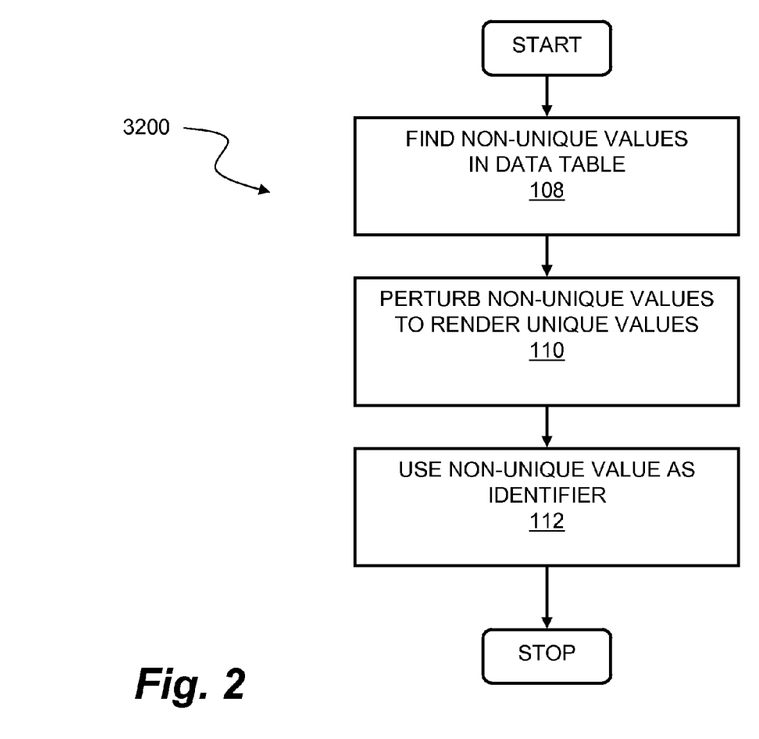
FIG. 2 depicts data perturbation of non-unique values.

Referring to FIG. 2, a logical process 3200 for creating a data perturbation dataset is shown. The process begins at logical block 3202 where the process may find a non-unique value in a data table. Next, the non-unique values may be perturbed to render unique values 3204. In embodiments, the non-unique value may be used as an identifier 3208.

In embodiments, a permission to perform a data perturbation action may be based on the availability condition. A process may permit the data perturbation action if the data perturbation action is not forbidden by the availability condition.

In embodiments, the data table may be a fact data table. In embodiments, the fact data table may encompass a Cartesian product or cross join of two source tables. Therefore, the fact table may be relatively large.

In embodiments, the fact data table may be a retail sales dataset. In other embodiments, the fact data table may be a syndicated sales dataset.

In embodiments, the syndicated sales dataset is a scanner dataset.

In embodiments, the syndicated sales dataset is an audit dataset.

In embodiments, the syndicated sales dataset is a combined scanner-audit dataset.

In an embodiment, the fact data table may be a point-of-sale data.

In an embodiment, the fact data table may be a syndicated causal dataset.

In an embodiment, the fact data table may be an internal shipment dataset.

In an embodiment, the fact data table may be an internal financial dataset.

In embodiments, the data table may be a dimension data table. In an embodiment, the dimension may a hierarchy.

In an embodiment, the fact data table may be a category.

In an embodiment, the fact data table may be a data segment.

In an embodiment, the fact data table may be a time.

In an embodiment, the fact data table may be a venue.

In an embodiment, the fact data table may be geography.

In an embodiment, the fact data table may be demography.

In an embodiment, the fact data table may be a behavior.

In another embodiment, the fact data table may be a life stage.

In yet another embodiment, the fact data table may be a consumer segment.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method for performing an aggregating query based on distinctness of data values in a target dimension by ensuring uniqueness of each data item in the target dimension, the method comprising:

finding a non-unique value in a dimension of a data table of a relational database, wherein the data table includes a fact table and the dimension contains numeric values;

perturbing the non-unique value to render a perturbed instance of the non-unique value that is unique in the dimension of the data table;

replacing the non-unique value with the perturbed instance;

repeating the above steps to provide a perturbed data table consisting of unique values in the dimension; and performing an aggregating query of the perturbed data table in the relational database without using a SQL join command.

2. The method of claim 1 wherein the data table includes sales data collected at a point of sale.

3. The method of claim 1 wherein the data table includes information collected from a panel of consumers.

4. The method of claim 1 wherein the data table includes survey data from a consumer survey.

5. The method of claim 1 wherein the data table includes data from a loyalty program.

6. The method of claim 1 wherein the data table includes data related to a sales projection.

7. A computer program product for performing an aggregating query based on distinctness of data values in a target dimension by ensuring uniqueness of each data item in the target dimension, the computer program product comprising computer executable code embodied in a non-transitory computer readable medium that, when executing on one or more computing devices, performs the steps of:

finding a non-unique value in a dimension of a data table of a relational database, wherein the data table includes a fact table;

perturbing the non-unique value to render a perturbed instance of the non-unique value that is unique in the dimension of the data table;

replacing the non-unique value with the perturbed instance;

repeating the above steps to provide a perturbed data table consisting of unique values in a dimension; and performing an aggregating query of the perturbed data table in the relational database without using a SQL join command.

8. The computer program product of claim 7 wherein the data table includes sales data collected at a point of sale.

9. The computer program product of claim 7 wherein the data table includes information collected from a panel of consumers.

10. The computer program product of claim 7 wherein the data table includes survey data from a consumer survey.

11. The computer program product of claim 7 wherein the data table includes data from a loyalty program.

12. The computer program product of claim 7 wherein the data table includes data related to a sales projection.

* * * * *